US007010403B2

(12) United States Patent
Adachi et al.

(10) Patent No.: US 7,010,403 B2
(45) **Date of Patent: *Mar. 7, 2006**

(54) CONSTRUCTION MACHINE MANAGEMENT SYSTEM, AND CONSTRUCTION MACHINE

(75) Inventors: Hiroyuki Adachi, Tsuchiura (JP); Toichi Hirata, Ushiku (JP); Genroku Sugiyama, Ryuugasaki (JP); Hiroshi Watanabe, Ushiku (JP); Koichi Shibata, Niihari (JP); Hideki Komatsu, Kitasouma (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 48 days.

This patent is subject to a terminal disclaimer.

(21) Appl. No.: 10/240,009

(22) PCT Filed: Mar. 30, 2001

(86) PCT No.: PCT/JP01/02809

§ 371 (c)(1),
(2), (4) Date: Sep. 27, 2002

(87) PCT Pub. No.: WO01/73220

PCT Pub. Date: Oct. 4, 2001

(65) Prior Publication Data

US 2003/0093203 A1 May 15, 2003

(30) Foreign Application Priority Data

Mar. 31, 2000 (JP) ............................ 2000-099086

(51) Int. Cl.
*G06F 19/00* (2006.01)
*G06F 7/70* (2006.01)

(52) U.S. Cl. ........................ 701/50; 701/207; 701/213; 340/438; 340/439; 340/441

(58) Field of Classification Search .................. 701/50, 701/29, 33, 101, 102, 112, 113, 115, 207, 701/213, 30–31, 34–35; 340/870.01, 870.03, 340/870.16, 901, 438, 439, 441, 426.22, 340/426.23, 426.24, 459, 500, 517, 523–524, 340/540; 307/9.1, 10.1–10.3
See application file for complete search history.

(56) References Cited

U.S. PATENT DOCUMENTS

| | | | | |
|---|---|---|---|---|
| 4,119,943 A * | 10/1978 | Harazoe et al. | ............. | 340/459 |
| 4,644,334 A * | 2/1987 | Yato et al. | .................. | 340/679 |
| 5,745,026 A * | 4/1998 | Kokubu et al. | ........ | 340/286.01 |
| 5,990,800 A * | 11/1999 | Tamaki et al. | .............. | 340/679 |
| 6,256,594 B1 * | 7/2001 | Yamamoto et al. | ......... | 702/185 |
| 6,542,851 B1 * | 4/2003 | Hasegawa et al. | .......... | 702/182 |
| 6,614,361 B1 * | 9/2003 | Kinugawa | .............. | 340/870.16 |
| 6,751,541 B1 * | 6/2004 | Komatsu et al. | .............. | 701/50 |
| 2002/0107624 A1 * | 8/2002 | Rutz | ........................... | 701/50 |

(Continued)

FOREIGN PATENT DOCUMENTS

EP 0 989 525 A2 3/2000

(Continued)

*Primary Examiner*—Gertrude A. Jeanglaude
(74) *Attorney, Agent, or Firm*—Oliff & Berridge, PLC

(57) ABSTRACT

A construction machine comprises a location detector for detecting location information for the construction machine, a determination device for determining whether or not location information is to be transmitted and outputting a transmission signal if it is determined that information is to be transmitted, and a transmitter for transmitting the detected location information to a base station in response to the transmission signal.

4 Claims, 10 Drawing Sheets

U.S. PATENT DOCUMENTS

| | | | | |
|---|---|---|---|---|
| 2002/0116107 | A1 * | 8/2002 | Mahoney et al. | 701/50 |
| 2004/0186687 | A1 * | 9/2004 | Ogura et al. | 702/185 |

FOREIGN PATENT DOCUMENTS

| | | |
|---|---|---|
| JP | A 4-174387 | 6/1992 |
| JP | A 4-174388 | 6/1992 |
| JP | A 7-273714 | 10/1995 |
| JP | A 8-136639 | 5/1996 |
| JP | A 8-144312 | 6/1996 |
| JP | A 10-138875 | 5/1998 |
| JP | A 10-222227 | 8/1998 |
| JP | A 10-308983 | 11/1998 |
| JP | A 11-65645 | 3/1999 |
| JP | A 2000-027236 | 1/2000 |

* cited by examiner (HYDRAULIC EXCAVATOR)

CONSTRUCTION MACHINE MANAGEMENT SYSTEM, AND CONSTRUCTION MACHINE

TECHNICAL FIELD

The present invention relates to a construction machine capable of transmitting location information to a base station, and to a management system using this construction machine.

BACKGROUND ART

Systems for managing traveling conditions of vehicles such as cars, dump trucks etc. have been disclosed in, for example, Japanese Laid-open Patent Publication No. H4-174387 and Japanese Laid-open Patent Publication No. H4-174388. With the systems disclosed in these patent publications, location information of individual vehicles is detected using a GPS satellite, and that location information is regularly transmitted to a base station. However, it is not always necessary to keep current location information at the base station, depending on the intended use for the location information. By transmitting the information regularly as described above, it is uneconomical because transmission costs may be increased needlessly.

The systems disclosed in the above publications are for managing traveling time of a vehicle such as a car or dump truck using traveled distance of the vehicles, but a construction machine such as a hydraulic excavator etc, is generally transported to a site located remote from the site where the management system resides, and is used at that remote location. Upon completion of work, it is common to leave the construction machine behind at that remote location because it is too troublesome to collect the machine using a transport vehicle. Under these conditions, management of the construction machine by a manager is compromised, which places a mental strain on the manager.

A managing division for construction machines, namely a construction machine maker or rental company, must carry out management tasks to ascertain the usage conditions of a construction machine that has been supplied or provided and not to cause any inconvenience to the party being supplied or provided with the construction machine. For example, in the event that the construction machine breaks down, the location of the broken down machine is confirmed through contact from the person being supplied or provided with the construction machine, and a serviceman will only be called out after confirmation, which takes some time and delays the machine being put back in to service.

DISCLOSURE OF THE INVENTION

The object of the present invention is to provide a construction machine and a construction machine management system to reduce communication cost by transmitting construction machine location information as required, and not to cause any inconvenience to a party supplied or provided with the construction machine.

In order to achieve the above object, a construction machine management system of the present invention comprises a location detector for detecting location information of a construction machine, a determination device for determining whether or not the location information is to be transmitted and outputting a transmission signal when it is determined that the location information is to be transmitted, and a transmitter for transmitting the location information detected at that time to a base station in response to the transmission signal.

According to the present invention, because of the structure where the determination device for determining whether or not the location information is to be transmitted is provided and the location information is transmitted from the construction machine only when it is determined that it should be transmitted, it is possible to reduce the communication cost compared to the case of transmitting the location information regularly.

It is also acceptable to determine whether or not an actuator switch has been actuated and to output the transmission signal when it has been actuated. Furthermore, a fault detector may be provided for detecting whether or not the construction machine has a fault, and in the event that a fault has been detected at the time of outputting the transmission signal, fault information may be transmitted together with the location information. Alternatively, fault information may be transmitted together with the location information when a fault is detected by the fault detector. It is also acceptable to determine whether or not there is a transmission instruction from a base station, and to output the transmission signal when there is a transmission instruction. Furthermore, it is acceptable to determine whether or not the construction machine engine has been started or stopped, and to output the transmission signal when the engine is started and when the engine is stopped.

A storage device may be provided for storing location information detected when the construction machine engine is stopped, so that the location information detected when starting the engine is transmitted in the event that the location information detected when the engine is started again and the stored location information detected when the engine was stopped are separated by a specified distance or more. Therefore, it is possible to determine location abnormality for the construction machine (whether or not there is a danger of theft) by comparing the location information at the stop time and start time in the base station. Also, since the location information detected at the time the engine is stopped is stored, and the location information at the time the engine is started is transmitted in the event that the location information detected when the engine is re-started and the stored location information detected when the engine was stopped are separated by a predefined distance or more, it is possible to rapidly deal with the case of a theft arising, and to contribute to reducing thefts in the first place, by the base station sending that information to a user and to other persons involved.

A construction machine management system of another aspect of the present invention comprises a location detector, provided in the construction machine, for detecting location information of the construction machine, a transmitter for transmitting location information detected by the location detector, and a determination device, provided at a location remote from the construction machine, for determining whether or not there is an abnormality with respect to the location of the construction machine based on the location information from the transmitter.

Since it is determined whether or not there is an abnormality with respect to the location of the construction machine based on location information from the construction machine, it is possible to determine a location abnormality of the construction machine (a danger of theft etc.) and to take appropriate measures to prevent theft.

The determination result of the determination device may be transmitted to a managing division or a user of the construction machine using electronic mail or the like.

DESCRIPTION OF THE PREFERRED EMBODIMENTS

-First Embodiment-

An embodiment of a management system according to the present invention will now be described by applying it to a hydraulic excavator, using FIG. 1 to FIG. 3.

Figure 1:
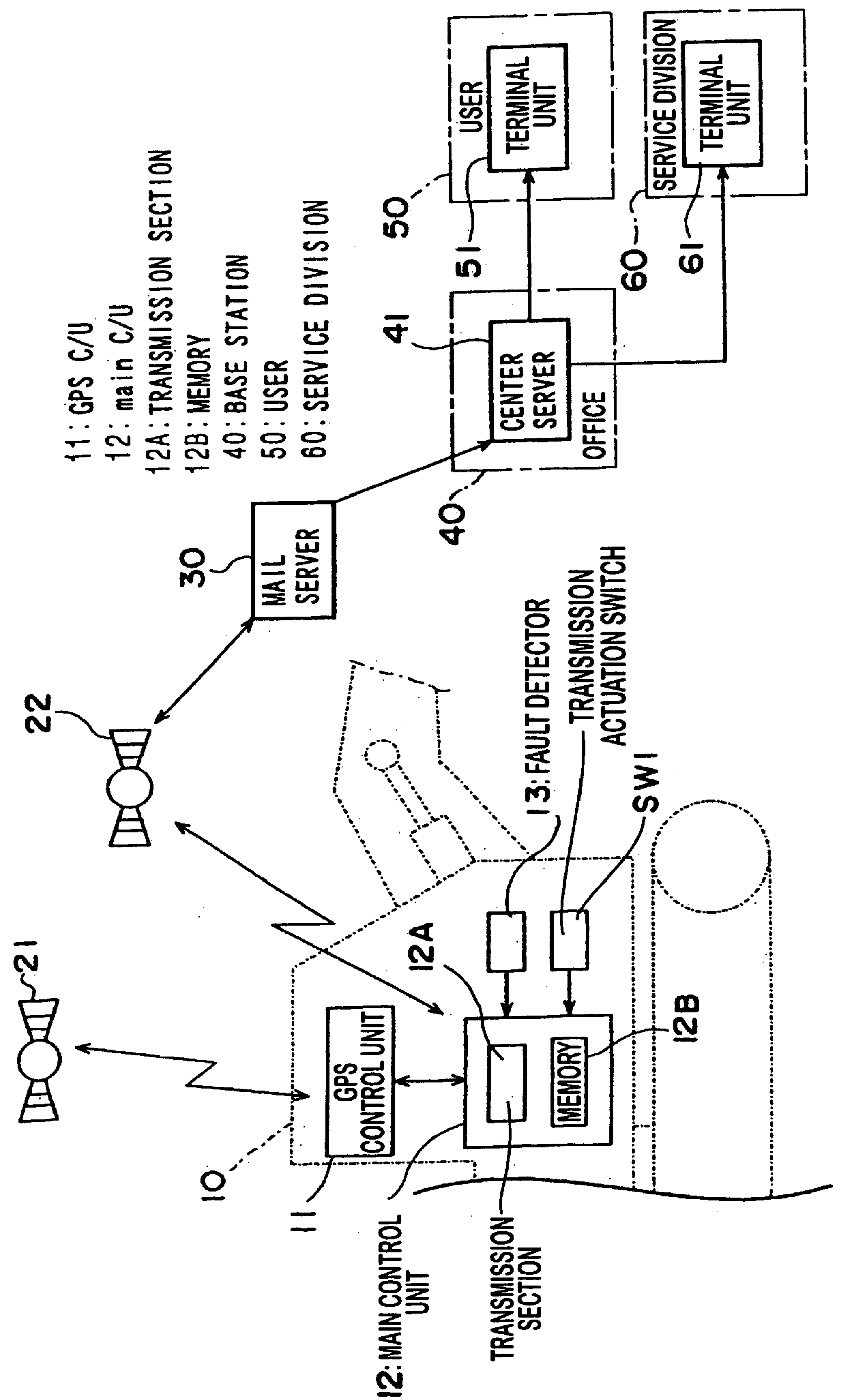
FIG. 1 is a schematic diagram of a management system of an embodiment of the present invention.

FIG. 1 is a schematic diagram of a system of the present invention. GPS control units 11 mounted separately in each hydraulic excavator 10 receive radio signals from a plurality of GPS satellites 21 and calculate location information for each hydraulic excavator 10 (in which they are mounted). The calculated location information is input to a main control unit 12. The location information here is, for example, geographical information (latitude and longitude). A transmission actuation switch SW1 provided in the operator's cabin and a fault detector 13 for detecting faults with the hydraulic excavator 10 are also connected to the main control unit 12. The transmission actuation switch SW1 is a switch actuated by the operator when wishing to transmit location information. The fault detector 13 detects various faults of the hydraulic excavator 10 for each type of hydraulic excavator, and inputs the detection result to the main control unit 12. There are various contents for the faults, for example, sensor voltage abnormality of respective sensors, engine speed abnormality, engine oil pressure abnormality, battery charge abnormality, cooling water temperature abnormality, abnormality of boom raising operation amount, abnormality of traveling operation amount, etc.

The main control unit 12 has a transmission section 12A for transmitting inputted location information and fault information, and a memory 12B for storing location information. Information transmitted from the transmission section 12A is sent via a communications satellite 22 to a management server at a ground-side. With this embodiment, a mail server 30, for example, is used as the management server. Transmission information is a variety of information such as information indicating the operating statuses of the hydraulic excavator 10, as well as the above described location information and fault information.

A center server 41 is provided in a base station (for example, the head office or branch office of the construction machine company) 40 located remote from the hydraulic excavator 10. The center server 41 is capable of taking in information transferred from the mail server 30, processing the information and transmitting the information to a terminal unit 51 of the user 50 and a terminal unit 61 of the service division 60, as required, through communications lines, for example a telephone line, using mail or the like.

Next a specific example of information transmit/receive processing will be described with reference to the flowcharts of FIG. 2 and FIG. 3.

Figure 2:
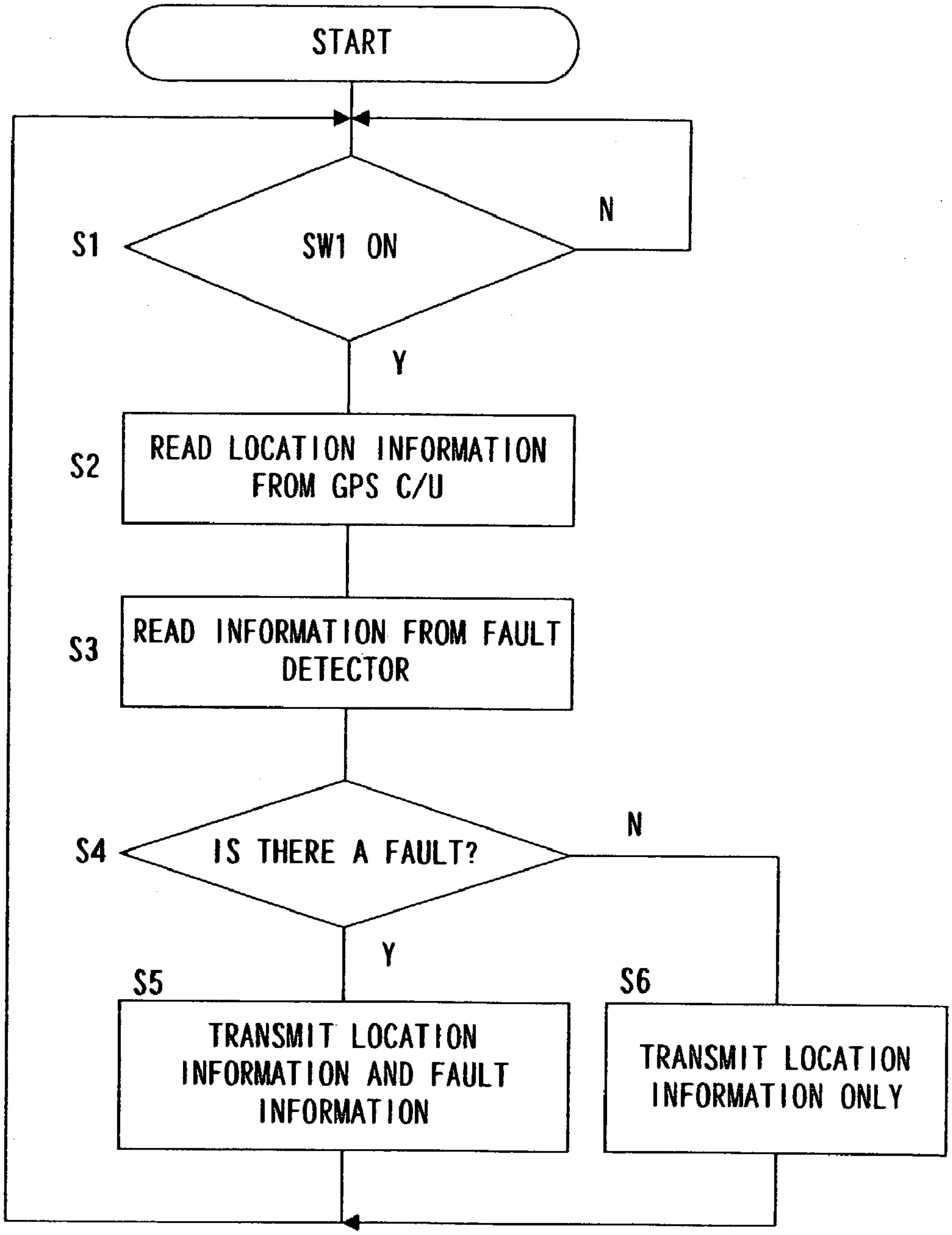
FIG. 2 is a flowchart showing a processing procedure for a hydraulic excavator of a first embodiment.
Figure 3:
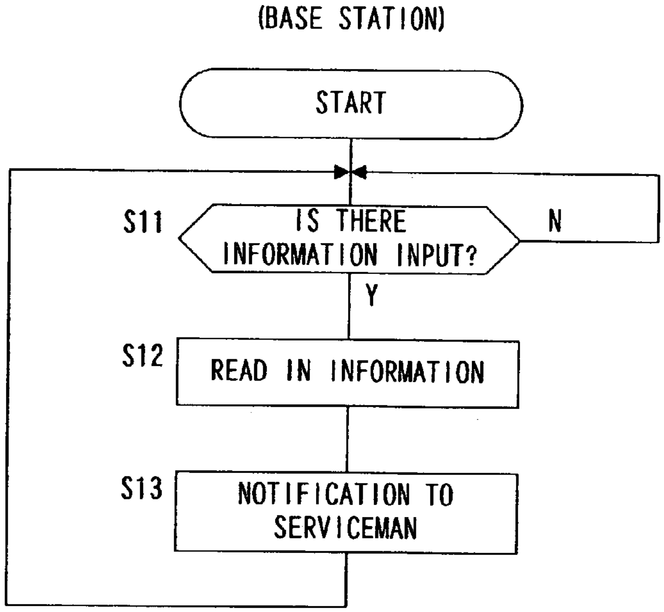
FIG. 3 is a flowchart showing a processing procedure for a base station of the first embodiment.

FIG. 2 is a flowchart showing processing of the main control unit 12 of the hydraulic excavator 10.

In step S1, it is determined whether or not the transmission actuation switch SW1 has been actuated. If it is determined that the switch has been actuated, location information for the hydraulic excavator 10 is read in from the GPS control unit 11 (step S2). Then, presence/absence of a fault is input from the fault detector 13 (step S3). The location information thus read in is location information at the point in time that the transmission actuation switch SW1 is turned on.

In step S4, it is determined whether or not there is a fault based on the information input from the fault detector 13. If it is determined that there is a fault, the location information and fault information are transmitted from the transmission section 12A (step S5), while if it is determined that there is no fault, only the location information is transmitted (step S6). Fault information indicates the place where an abnormality has occurred, and is transmitted as a code number set in advance, such as "01" for a sensor abnormality, "02" for an engine speed abnormality, etc.

Transmitted information is sent through the communications satellite 22 to the mail server 30, as described above, and information is transferred from the mail server 30 to the base station 40. FIG. 3 shows processing for the center server 41 of the base station 40. In step S11, it is determined whether or not information has been sent from the mail server 30, and if it is determined that information has been sent, that information is read in (step S12). The location information and the fault information that have been read in is sent to a terminal unit 61 of a service division 60.

The service division 60 ascertains the location of the hydraulic excavator 10 based on location information received by the terminal unit 61, and dispatches a serviceman to the site where the hydraulic excavator 10 is. When fault information is also received together with the location information, it is possible to ascertain details of faults based on the fault information, and so the serviceman can go to the site taking with him equipment for repairing the fault. Therefore, a repair can be carried out within a short period of time of the fault occurring, and it is possible to keep working delays to a minimum.

Fault information is not always necessary. For example, if the operator actuates the transmission actuation switch SW1 when the hydraulic excavator 10 has become overturned, transmitted location information is conveyed to the service division 60 via the base station 40. By conveying the information, it is possible to allow the serviceman to arrive at the site within a short period of time, so that effective measures can be taken speedily to restore the machine to full working order.

Furthermore, by actuating the transmission actuation switch SW1 when fuel reserves are running low, refueling can be carried out speedily. For example, the amount of fuel remaining is checked at the hydraulic excavator 10 side when the transmission actuation switch SW1 is actuated, and in the case the fuel amount is low, information indicating low fuel amount is transmitted together with the location information Therefore, it is possible to deal with the situation more rapidly.

With this type of embodiment, since location information is transmitted in accordance with an operator actuating a switch, it is possible to economize on transmission costs compared to the case of transmitting location information at any time.

With this embodiment, information is transmitted by actuation of a switch SW1, but also, the fault information and the location information may be transmitted when occurrence of fault has been detected. In this way, information can be transmitted to a base station 40 and service division 60 almost as soon as a fault arises, making it possible to deal with the fault rapidly. Accordingly, working delays due to faults can be kept to the shortest time possible.

-Second Embodiment-

A second embodiment of the present invention will now be described using FIG. 4 to FIG. 7.

With this embodiment, it is determined that there is a danger that the hydraulic excavator 10 has been stolen if locations of the hydraulic excavator 10 are different at the point in time the engine of the hydraulic excavator 10 was turned off and the point in time it is turned on again, and the location information at the engine start-up time point is transmitted. The system structure is identical with FIG. 1.

Figure 4:
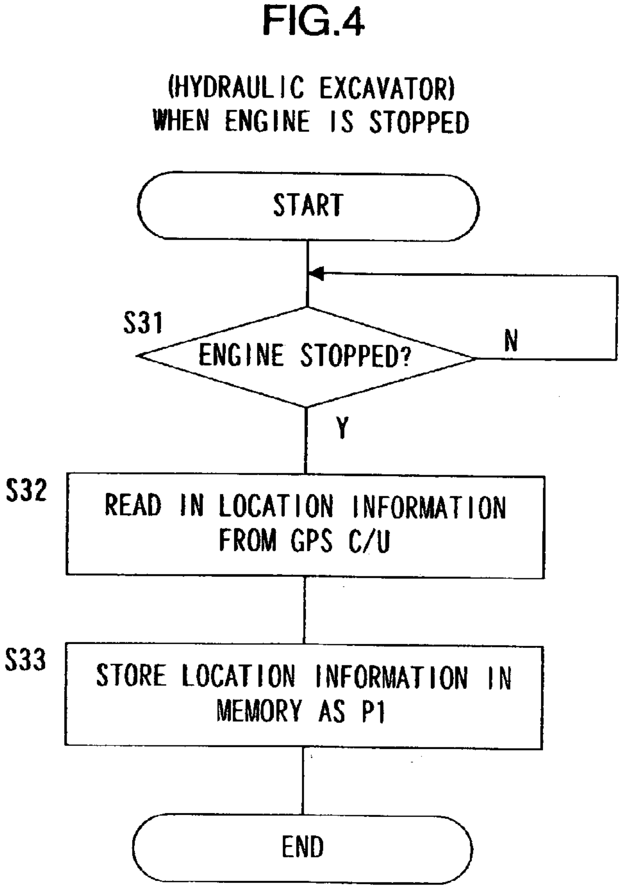
FIG. 4 is a flowchart showing a processing procedure for a hydraulic excavator of a second embodiment.

FIG. 4 shows processing in the main control unit 12 of the hydraulic excavator 10 when the engine is stopped. In step S31, if it is determined that the engine has been stopped, for example from an engine key off signal, location information at that time point is read in from the GPS control unit 11 (step S32). Then the location information thus read in is stored in the memory 12B as location information P1 (step S33). Therefore, when the engine is started up again, the location information for when the engine was stopped the previous time is stored without fail in the memory 12B.

Figure 5:
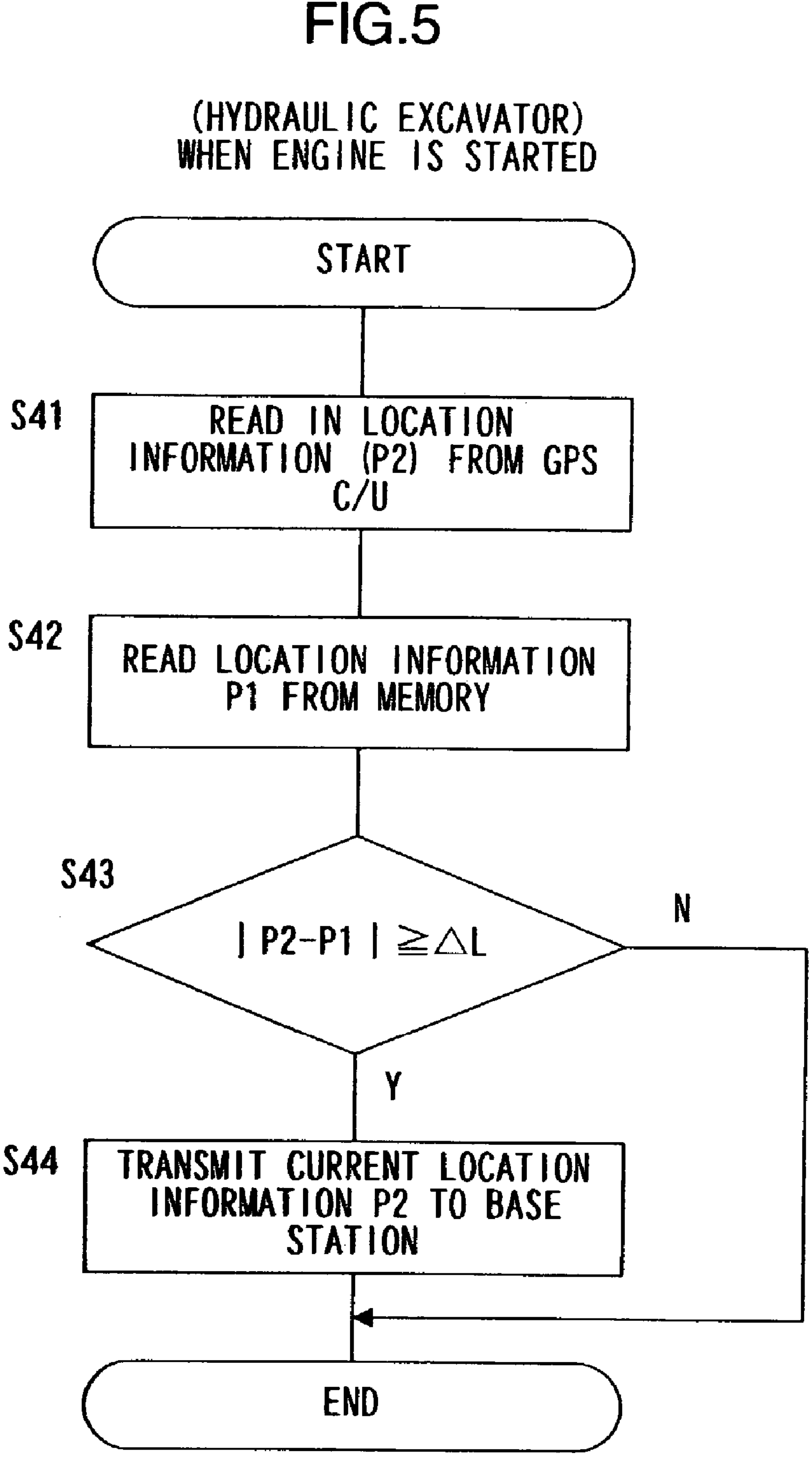
FIG. 5 is a flowchart showing a processing procedure for the hydraulic excavator of the second embodiment.

FIG. 5 shows processing in the main control unit 12 when the engine is started up. First of all, location information for that time point is read out from the GPS control unit 11, and is referred as location information P2 (step S41). Information stored in the memory 12*b*, namely the location information P1 for the moment in time the engine was stopped the previous time, is read out (step S42), and a distance between P1 and P2 is compared with a predetermined distance ΔL (step S43). If the distance between P1 and P2 is equal to or greater than the predetermined distance ΔL, that is, if the locations of the hydraulic excavator 10 at the engine stop time point and at the engine re-start time point are separated by the predefined distance ΔL or greater, it is determined that the location of the hydraulic excavator 10 is abnormal (there is a possibility of a theft having been committed). Then, the current location information P2 is transmitted (step S44). In that case, information indicating that there is a danger of the hydraulic excavator 10 having been stolen may also be transmitted together with the location information.

Figure 6:
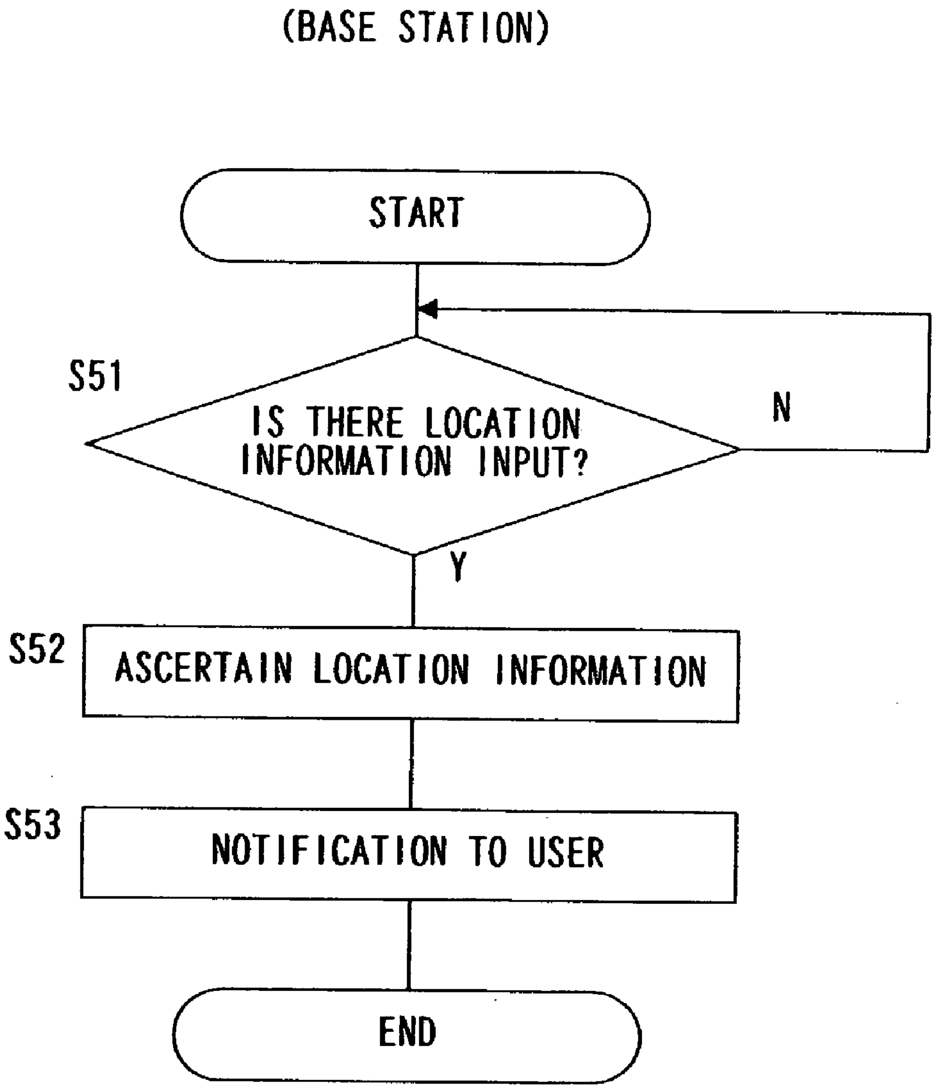
FIG. 6 is a flowchart showing a processing procedure for a base station of the second embodiment.

FIG. 6 shows processing for the center server 41 of the base station 40. In step S51, it is determined whether or not there is location information, and if there is location information it is determined whether or not the location information has been transmitted. When information has been transmitted, the location information is read in (step S52). The information thus read in is notified to the user 50 side by mail or the like (step S53).

Figure 7:
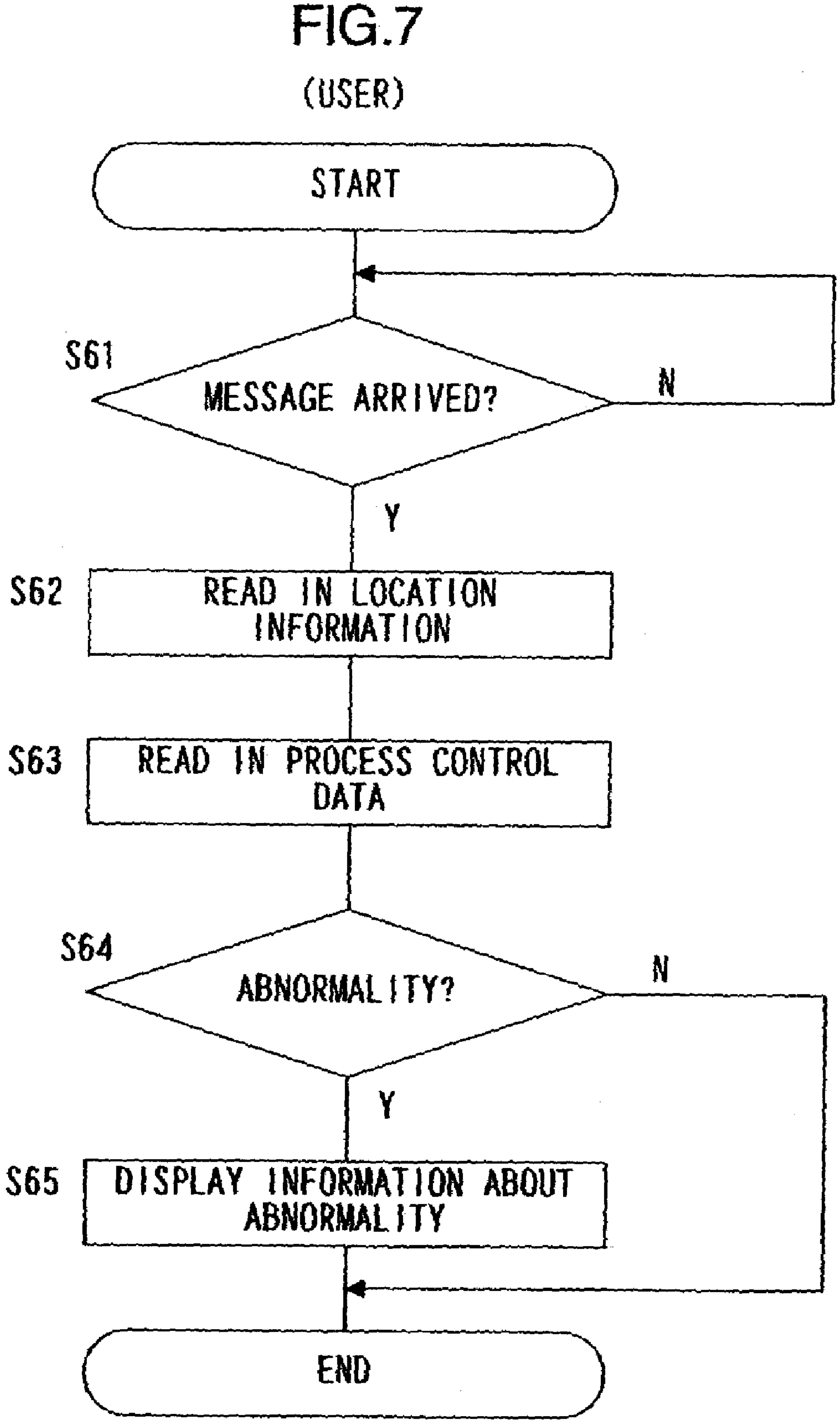
FIG. 7 is a flowchart showing a user side processing procedure of the second embodiment.

FIG. 7 shows one example of processing executed by the terminal unit 51 of the user 50 side terminal unit 51. If it is determined in step S61 that mail has arrived, location information for the hydraulic excavator 10 is ascertained by reading in this mail (step S62). Process control data created in advance at the user side is read in (step S63) and it is determined whether or not there is any abnormality (step S64). For example, when transmitted location information is significantly different from a location set in the process control data, it is determined that there is an abnormality and information indicating the location abnormality is displayed on a screen of the terminal unit 51 (step S65). When the abnormality information is displayed, a person in charge contacts people involved or in some cases notifies the police. Therefore, the hydraulic excavator 10 may be recovered soon even if it has been stolen. Also, by extending this type of system it is possible to reduce thefts. Further, by only transmitting location information when there is a danger of a theft having been perpetrated, it is also possible to reduce transmission costs.

In the above description, location information when the engine is stopped and when the engine is started again are compared at the hydraulic excavator side, but it may also be performed at the base station side. In other words, the excavator side simply transmits the location information P1 when the engine is stopped and the location information P2 when the engine is re-started each time the information is obtained, and the base station side compares the two items of location information and determines whether or not there is a danger of a theft having occurred.

As another variation of this embodiment, it is acceptable to have a configuration capable of transmitting information from the base station 40 side to the hydraulic excavator 10, for example, so that if the main control unit 12 of the hydraulic excavator 10 receives a transmission command from the base station 40, the location information at that time is transmitted. This configuration is convenient in the case, for example, where it has become necessary to know the location of a particular hydraulic excavator 10 at either the base station 40 or user side.

-Third Embodiment-

A third embodiment of the present invention will now be described using FIG. 8 to FIG. 11. This embodiment, similarly to the second embodiment, is also intended to prevent theft of the hydraulic excavator 10.

Figure 8:
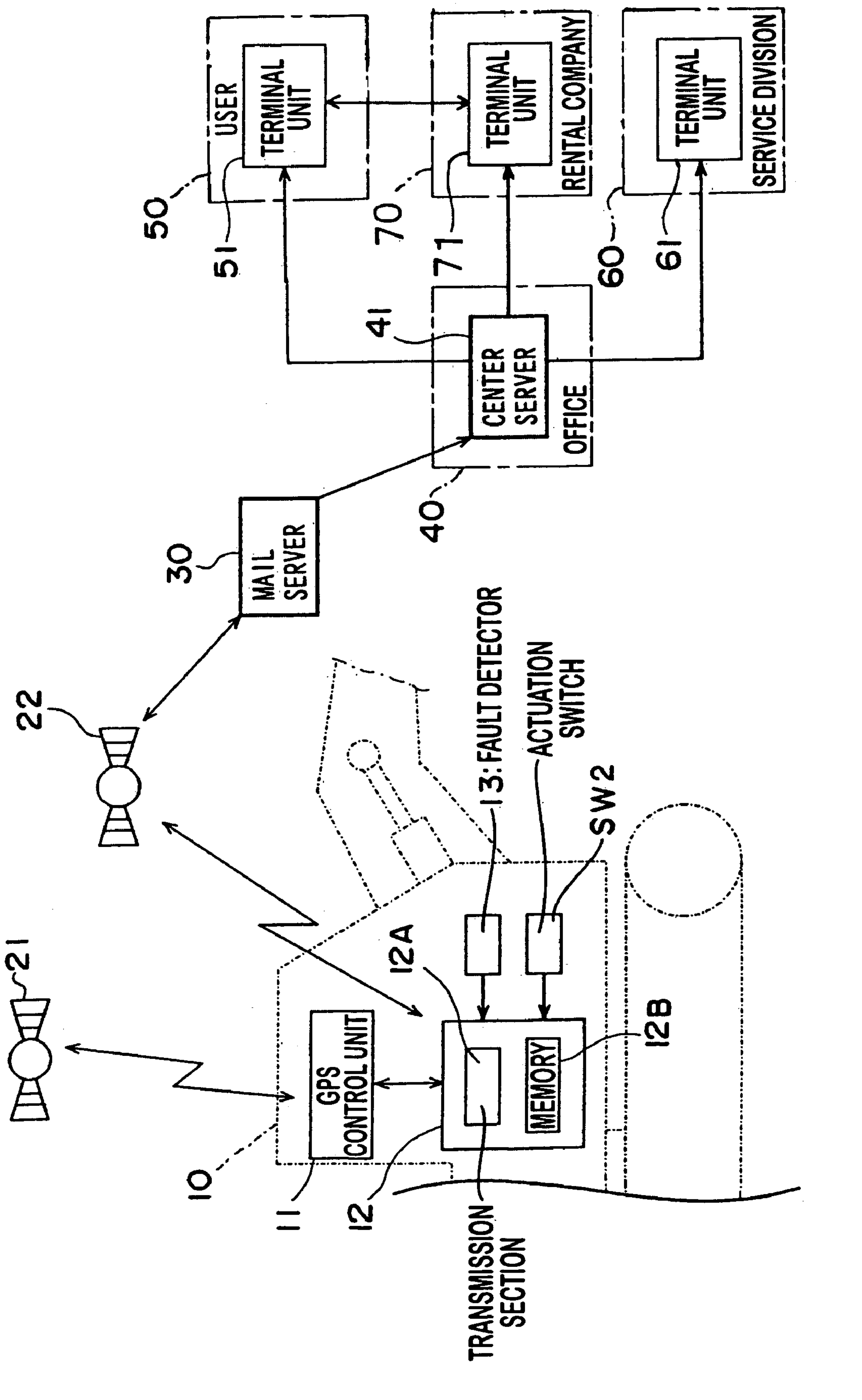
FIG. 8 is a schematic diagram of a management system of a third embodiment.

FIG. 8 is a schematic diagram of this embodiment, and structural elements that are the same as those in FIG. 1 have the same reference numerals attached thereto. A center server 41 of the base station 40 is capable of transmitting information as required to a terminal unit 71 of a construction machine rental company 70 via communications line such as a telephone line, using electronic mail or the like. Information communication is also possible between the terminal 71 of the rental company 70 and a terminal 51 of a user 50 using the construction machine of the rental company 70. The remaining structure is the same as in FIG. 1.

A base station 40 being one of the managing division for the construction machine, performs a service for a user 50 to register the construction site for a construction machine such as a hydraulic excavator 10 etc. on the base station's web site. For example, if the user 50 uses a terminal unit 51 to access a specified web-site of the base station 40, a map showing the entire country divided into a plurality of areas will be displayed on the screen. If the user 50 then clicks on an area containing the current working location of the construction machine they themselves are using, the area is transmitted to the base station 40 as working area information.

Another method may be used where a working area is designated by the user 50 by inputting the name of a province or region, or selecting from a plurality of candidates, without using a map.

Figure 9:
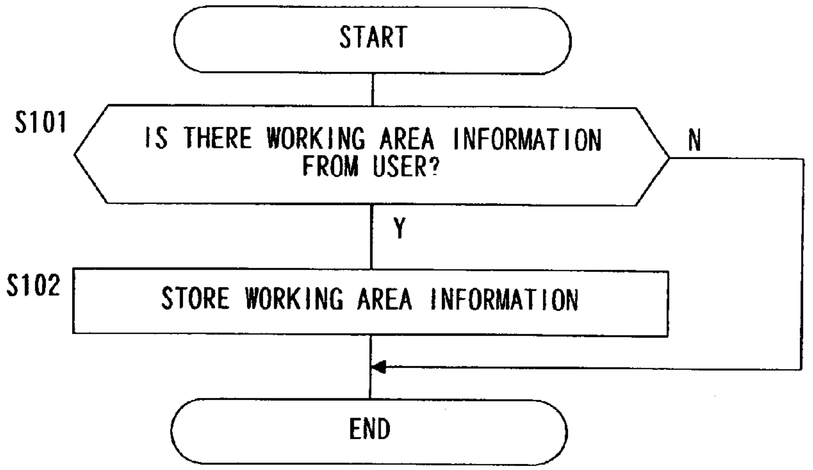
FIG. 9 is a flowchart showing a base station side processing procedure for the third embodiment.

As shown in FIG. 9, if the center server 41 of the base station 40 confirms that working area information has been transmitted from the user 50 (step S101), the working area information is correlated to the user 50 and registered in a database (step S102).

Figure 10:
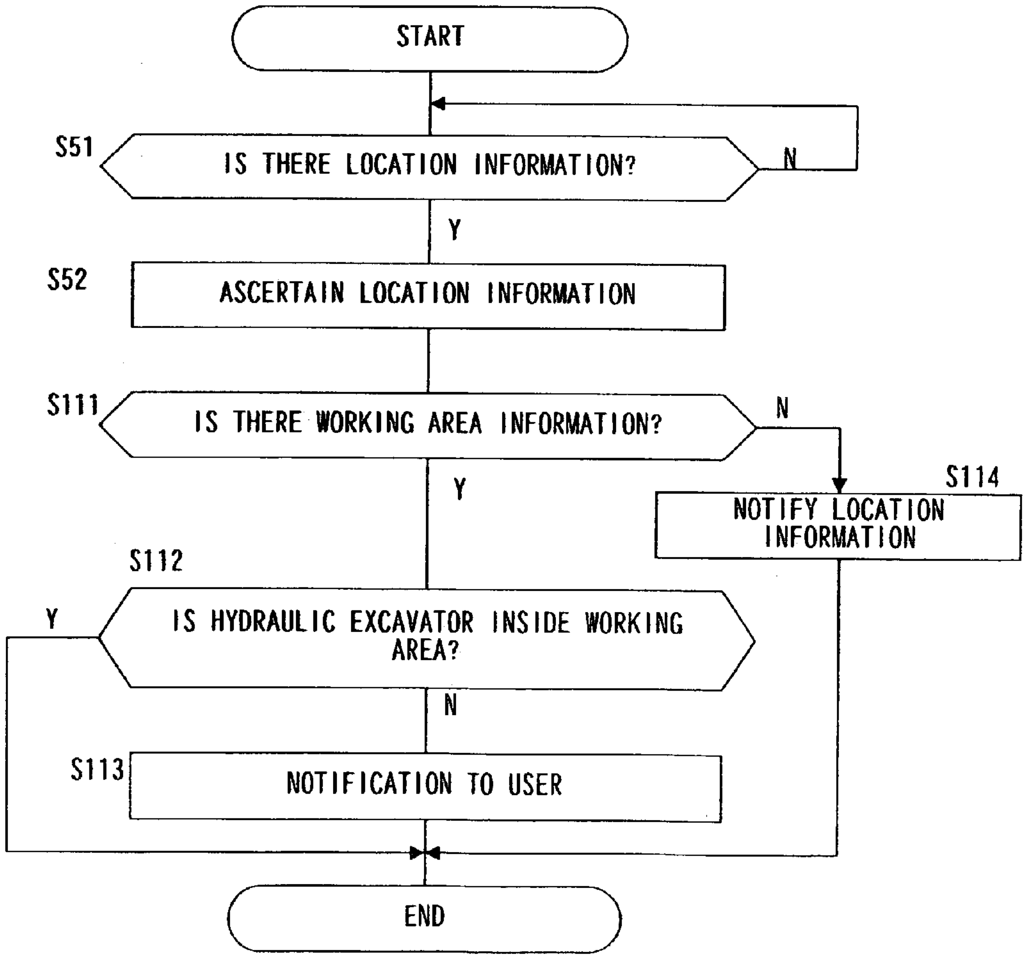
FIG. 10 is a flowchart showing another processing procedure for the base station side in the third embodiment.

FIG. 10 shows other processing for the center server 41 of the base station 40. In the same way as described with FIG. 6, in step S51 it is determined whether or not location information has been transmitted from the hydraulic excavator 10, and if the information has been transmitted, then the location information is read in (step S52). Next, it is determined whether or not working area information corresponding to the user 50 using the hydraulic excavator 10 in question is stored in the database (step S111). In the event that working area information is stored, it is determined whether or not the hydraulic excavator 10 exists within the working area in question based on the working area information and the location information (step S112). In the event that the hydraulic excavator 10 is not in the working area, it is determined that the location of the hydraulic excavator 10 is abnormal (that there is a possibility of a theft having been perpetrated) and this situation is notified to the user 50 or to the rental company 70, being another managing division for the construction machine, or both, using electronic mail or the like (step S113). The location information for the hydraulic excavator 10 is also notified at the same time. In the event that only the rental company is notified, it is preferable for the rental company 70 to notify the user 50.

Figure 11:
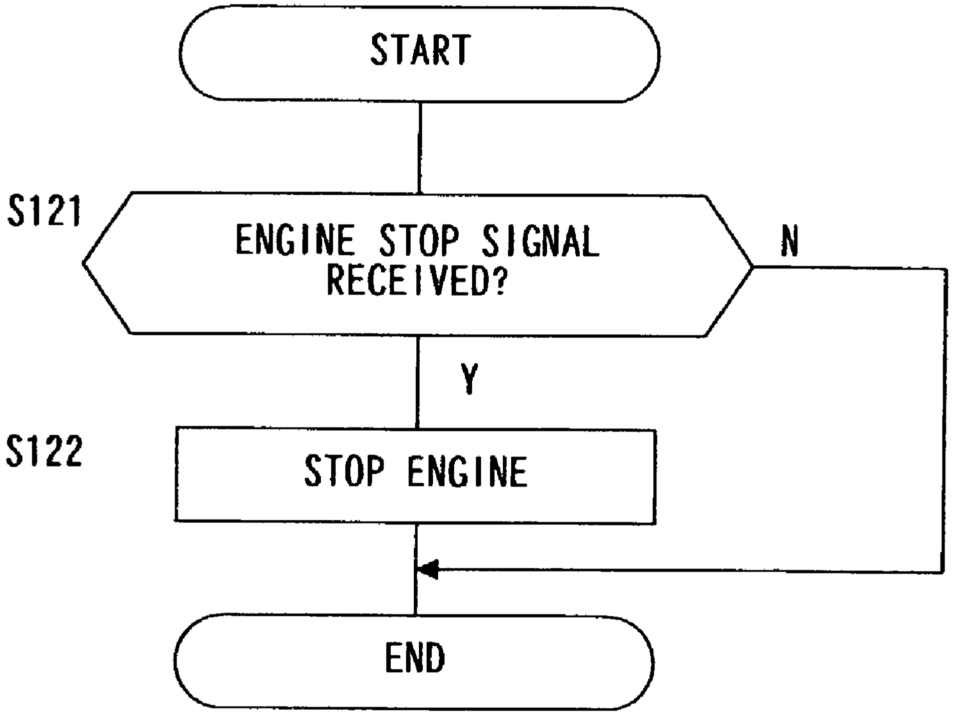
FIG. 11 is a flowchart showing a processing procedure for the hydraulic excavator of third embodiment.

Simultaneously with the notification in step S113, a signal instructing the engine of the hydraulic excavator 10 to be turned off may be transmitted via the mail server 30 and a communications satellite 22 to the hydraulic excavator 10. In this case, processing such as that of FIG. 11 is carried out by the main control unit 12 of the hydraulic excavator 10. In FIG. 11, it is determined whether or not a signal instructing the engine to be turned off has been received (step S121). Then, if such a signal has been received the engine is forcibly stopped (step S122).

On the other hand, in step S111 of FIG. 10, in the event that it is determined that working area information is not stored, location information of the hydraulic excavator 10 is notified to the user 50 or to the rental company 70 (step S114). In this case, determination as to whether or not a theft has been committed is carried out at the user 50 side or the rental company side.

It is also acceptable to execute processing equivalent to FIG. 11 described above at the rental company 70. In this case, the working area information from the base station 40 may be sent to the rental company 70, or the rental company may perform a working area information registration service.

With this embodiment, a structure has been described where comparison of working area information and location information for the user 50, and abnormality determination, have been performed in the center server 41. But it is also acceptable to transmit working area information in advance to the control unit 12 built into the hydraulic excavator 10, have this working area information stored in a memory of the control unit 12 and carry out comparison of working area information and location information, and abnormality determination, in the control unit 12. In that case, if an abnormality is detected, the fact that there is an abnormality is transmitted to the center server 41 together with location information. By adopting this type of structure, it is possible to carry out a determination whether or not to stop the hydraulic excavator 10 within the control unit 12, making it possible to prevent theft of the hydraulic excavator 10 even in the event that, for example, communication conditions are bad and location information can not be transmitted.

-Fourth Embodiment-

A fourth embodiment of the present invention will now be described using FIG. 8, FIG. 12, and FIG. 13.

In this embodiment, it is determined whether or not a theft has been perpetrated at the hydraulic excavator side. In FIG. 8, a switch SW2 provided in the hydraulic excavator 10 is an actuation switch actuated in order to store the current location of the hydraulic excavator 10.

Figure 12:
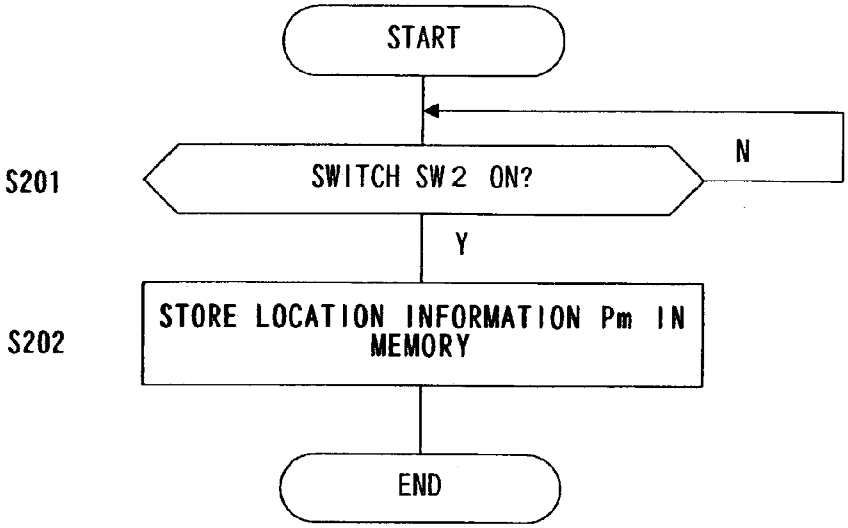
FIG. 12 is a flowchart showing a processing procedure for a hydraulic excavator of fourth embodiment.

As shown in FIG. 12, as the switch SW2 being turned on (step S201), the main control unit 12 of the hydraulic excavator 10 stores current location information Pm for the hydraulic excavator 10 into memory 12B (step S202). The operator actuates switch SW2, or example, at the time of starting work or completing work to cause the location information Pm to be stored.

Figure 13:
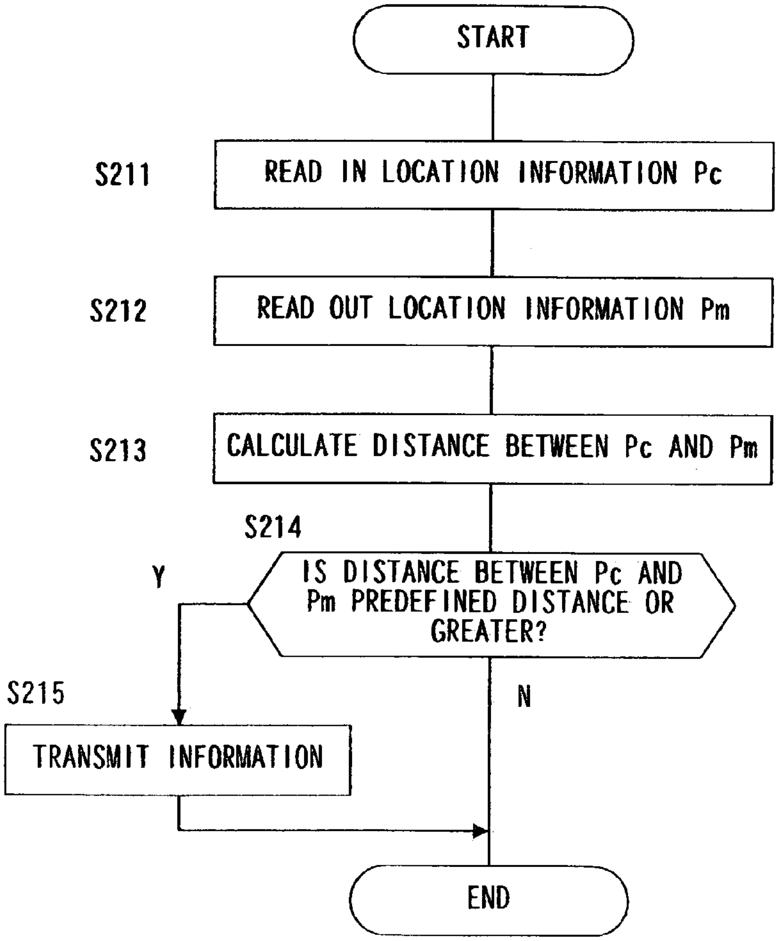
FIG. 13 is a flowchart showing a processing procedure for the base station side in the fourth embodiment.

FIG. 13 shows other processing in the main control unit 12. This processing is repeatedly executed at a fixed interval.

Current location information Pc is read in from the GPS control unit 11 (step S211), and at the same time location information Pm stored in the memory 12*b* is readout (step S212) A distance between Pc and Pm is obtained (step S213), and it is determined whether or not the distance thus obtained is equal to or greater than a predefined distance (step S214) When the distance is equal to or greater than the predefined distance, it is determined that a theft might have been perpetrated and the location information Pc and information indicating a danger of theft are transmitted via the transmission section 12A (step S215). The base station 40, upon receipt of this information, notifies the user 50 or the rental company 70 by electronic mail, in the same manner as described above.

If the thief actuates the switch SW2 when the hydraulic excavator 10 has been stolen, it will become impossible to accurately determine whether or not there has been a theft, and so the switch SW2 should be placed in an obscure place.

It is also acceptable in this embodiment to determine whether or not a theft might have been perpetrated in the base station 40 or the rental company 70. In this case, it is preferable for location information at the time the switch SW2 has been actuated to be transmitted, and this information to be stored in a memory device of the base station 40 or rental station 70 as location information Pm. Then, location information Pc periodically transmitted from the hydraulic excavator 10 is compared with location information Pm, and whether or not there might have been a theft is determined in the same manner as described above.

In the above described embodiments, the location of the hydraulic excavator has been detected using GPS satellites, but it may also be detected by using a PHS (Personal Handy-phone System) location information providing service or the like instead.

INDUSTRIAL APPLICABILITY

Description has been given above for a management system for hydraulic excavators, but the present invention can also be applied to a management system for construction machines other than hydraulic excavators (for example a crane etc.).

What is claimed is:

1. A construction machine management system that receives information transmitted from a construction machine at a receiver provided in a base station, wherein:

the construction machine comprises a location detector that detects location information of the construction machine, a determination device that determines whether the location information is to be transmitted and that outputs a transmission signal if it is determined that the location information is to be transmitted, a fault detector that detects whether there is a fault of the construction machine, and a transmitter that transmits the location information that has been detected to the base station for a notification in response to the transmission signal and that also transmits fault information, in addition to the location information, when the fault has been detected at a time of outputting the transmission signal.

2. A construction machine management system that receives information transmitted from a construction machine at a receiver provided in a base station, wherein:

the construction machine comprises a location detector that detects location information of the construction machine, a storage device that stores the location information detected when an engine of the construction machine is stopped, a determination device that determines whether the location information detected when the engine is started is separated from the location information detected and stored when the engine was stopped by a predefined distance or greater and that outputs a transmission signal when there is the predefined distance or greater, and a transmitter that transmits the location information detected when the engine is started to the base station for a notification in response to the transmission signal.

3. A construction machine management system according to claim 1, further comprising:

a base station side transmitter, provided in the base station, that transmits the location information received by the receiver to another organization.

4. A construction machine management system according to claim 2, further comprising:

a base station side transmitter, provided in the base station, that transmits the location information received by the receiver to another organization.

* * * * *